United States Patent [19]
Hashimoto et al.

[11] Patent Number: 4,695,513
[45] Date of Patent: Sep. 22, 1987

[54] MAGNETIC RECORDING MEDIUM

[75] Inventors: Minoru Hashimoto, Kawasaki; Hajime Takeuchi; Takeo Itoh, both of Yokohama, all of Japan

[73] Assignee: Kabushiki Kaisha Toshiba, Japan

[21] Appl. No.: 929,364

[22] Filed: Nov. 12, 1986

Related U.S. Application Data

[63] Continuation of Ser. No. 647,385, Sep. 5, 1984, abandoned.

[30] Foreign Application Priority Data

Sep. 6, 1983 [JP] Japan ................................ 58-162578

[51] Int. Cl.[4] ................................................ G11B 5/702

[52] U.S. Cl. ................................ 428/425.9; 252/62.54; 427/128; 428/328; 428/694; 428/522; 428/900; 428/329

[58] Field of Search ...................... 428/694, 522, 425.9, 428/329, 328, 900; 427/131, 128; 252/62.54; 360/134–136

[56] References Cited

U.S. PATENT DOCUMENTS

| | | | |
|---|---|---|---|
| 4,454,202 | 6/1984 | Komine | 428/900 |
| 4,503,120 | 3/1985 | Yamauchi | 428/694 |

FOREIGN PATENT DOCUMENTS

| | | |
|---|---|---|
| 3232008 | 3/1983 | Fed. Rep. of Germany . |
| 3302911 | 8/1983 | Fed. Rep. of Germany . |
| 3248403 | 8/1983 | Fed. Rep. of Germany . |
| 57-53824 | 3/1982 | Japan . |
| 57-208633 | 12/1982 | Japan . |

OTHER PUBLICATIONS

Kubo et al., "IEEE Transactions on Magnetics", vol. MAG-18, No. 6, p. 1122, (1982).

Sumiya et al., "IEEE Transactions on Magnetics", vol. MAG-20, No. 1, p. 90, (Jan. 1984).

*Primary Examiner*—Ellis P. Robinson
*Attorney, Agent, or Firm*—Schwartz, Jeffery, Schwaab, Mack, Blumenthal & Evans

[57] ABSTRACT

There is disclosed a magnetic recording medium wherein a magnetic powder is uniformly dispersed in a curable substance of a binder resin material comprising a vinyl chloride-vinyl acetate series resin and/or a polyurethane series resin, at least one of which having a B value in a following apparent viscosity equation:

$$\log \eta a = Bx + \log [\eta]$$

wherein $\eta a$ is an apparent viscosity (cP) at a temperature of 25° C., x is a resin concentration (wt %(), $[\eta]$ is a limiting viscosity (cP) at a temperature of 25° C. and B is a constant, of 10 or less, which is measured by dissolving the resin in a mixed solvent of equal weights of methyl ethyl ketone toluene and cyclohexanone; and the B value of the mixed binder resin being 11 or less.

The magnetic recording medium of the present invention is the high density recording medium having the great rectangular ratio and excellent in the noise properties.

10 Claims, No Drawings

MAGNETIC RECORDING MEDIUM

This application is a continuation of application Ser. No. 647,385, filed Sept. 5, 1984 now abandoned.

BACKGROUND OF THE INVENTION

This invention relates to a magnetic recording medium, more specifically to a magnetic recording medium which is improved in the dispersion properties and the orientation properties of magnetic particles in a magnetic coating film suitable for a high density recording.

A usual magnetic recording medium can be obtained by first dispersing a magnetic powder together with a binder resin so as to prepare a paint-like composition, applying the prepared composition to the surface of a support such as a polyester film, subjecting it to an orientation treatment, drying it and finally passing it through a surface smoothing process.

Such recording media are widely employed for a recording in VCR's audio systems and the like, but the increase in the density of the recording media is now required from the viewpoint of the demand of a prolonged recording time. As recording systems, there are no longitudinal magnetic recording systems in which a recording is carried out by the use of the recording medium magnetized inside it and along a lengthwise direction thereof, and a perpendicular recording system in which a recording is carried out by the use of the recording medium magnetized in a perpendicular direction thereof. The latter system is particularly suitable for the high density recording, and the researches on this perpendicular recording medium have extensively been conducted in recent years (see, for example, "Perpendicular Orientation of Magnetic Powder", K. Sumiya et al., IEEE transaction on magnetics, MAG-20, January 19; Proceedings of "Symposium on Magnetic Media Manufacturing Method", MMS-C-1 (1983), D. E. Speliotis & L. B. Lueck published by magnetic media Information services; "Tushin Gakkai Giho", MR 80-28, 17 (1980), Y. Sato et al.; and IEEE transaction on magnetics, MAG-18, 1122 (1982), O. Kubo et al.).

As the magnetic powder for use in the above-mentioned perpendicular recording medium, much attention is paid to a hexagonal system powder. Each hexagonal magnetic particle has a hexagonal plate shape and possesses magnetization easy axes. Thus, when the magnetic powder is applied to the surface of the support, the magnetization easy axes will easily be oriented perpendicularly to the support surface, which fact is advantageous.

In order to obtain the high density recording medium by the use of the hexagonal system magnetic powder, the size of each magnetic particle is preferably less than a recording minimum wavelength or a bit length. Further, the magnetic particles are required to be uniformly dispersed in the magnetic recording medium.

These requirements are based on the ground that if the magnetic particles in the recording medium are coagulated and if their dispersion is insufficient, surface properties and the like of the medium will be lowered, so that the deterioration in its reproduction output and an increase in noise will result, thereby obtaining no medium having a high performance.

However, each magnetic particle having such a minimum size takes a single magnetic domain structure. That is to say, it constitutes a minute magnet. Therefore, the magnetic particles tend to be magnetically bound with each other, and if bound, they will be difficult to be uniformly dispersed into the binder resin and their orientation properties will also be lowered.

SUMMARY OF THE INVENTION

An object of this invention is to provide a magnetic recording medium which is improved in the dispersion properties and the orientation properties of a magnetic powder in a magnetic coating film as well as the noise properties of a used medium in order to be suitable for a high density recording.

The inventors of the present case have conducted researches with the intention of achieving the above-mentioned object, and have finally found that when a magnetic coating film is formed using a binding agent comprising a polymer the molecules of which are less interwined with each other, the dispersion properties and the orientation properties of the magnetic powder will be remarkably improved as well as the noise reduced, and as a result, this invention has here been established.

According to this invention, there can be provided a magnetic recording medium wherein a magnetic powder is uniformly dispersed in a curable substance of a resin bonding material comprising a vinyl chloride-vinyl acetate resin and/or its modified resin, and/or a polyurethane series resin, at least one of which having a B value in a following apparent viscosity equation:

$$\log \eta a = Bx + \log [\eta]$$

wherein $\eta a$ is an apparent viscosity (cP) at a temperature of 25° C., x is a resin concentration (wt %), $[\eta]$ is a limiting viscosity (cP) at a temperature of 25° C. and B is a constant, of 10 or less, which is measured by dissolving said resin in a mixed solvent of equal weights of methyl ethyl ketone, toluene and cyclohexanone; and the B value of the mixed binder resin composed of the vinyl chloride-vinyl acetate series resin and/or the polyurethane series resin being 11 or less.

DESCRIPTION OF THE PREFERRED EMBODIMENTS

The B value in the above-mentioned viscosity equation of at least one of the used binder resin is 10 or less. This B value is an indication of showing a degree at which the molecules of the binder are interwined with each other. Generally, the smaller the B value is, the smaller their molecular weights are and the fewer their side chains are, depending on a kind of used binder.

Further, in this invention, the B value of the mixed resin is required to be 11 or less, more preferably 10 or less. When the B value of the mixed resin is in excess of 11, the interwined molecules will not be easily unwound, so that the dispersion properties of the magnetic powder will be deteriorated. This is the reason why the B value of the mixed resin is to be set to 11 or less.

As the binders, mixed systems of vinyl chloride-vinyl acetate series resins and polyurethane series resins are used.

The reason why the vinyl chloride-vinyl acetate series resins are employed is that these resins are good in adhesion to the surface of a support such as a polyester film and are excellent in dispersion properties, deformation resistance and the like.

Further, the reason why the polyurethane series resins are employed together is that they can improve the durability and the heat resistance of the coating film.

In order to adjust the B value of the mixed binder resin to 11 or less, the B value of at least one of the vinyl chloride-vinyl acetate series resin and the polyurethane series resin is required to be adjusted to 10 or less.

As usable vinyl chloride-vinyl acetate series resins, which include a vinyl chloride-vinyl acetate resin and-/or its modified resin, each having the B value of 10 or less, there are, for example, a vinyl chloride-vinyl acetate copolymer such as VYHD and VYLF (which are all trade marks of Union Carbide Co., Ltd.), a vinyl chloride-vinyl acetate-vinyl alcohol terpolymer such as VAGD, VROH and VYSM (which are all trade marks of Union Carbide Co., Ltd.) and a vinyl chloride-vinyl acetate-maleic acid terpolymer such as VMCH, VMCC, and VMCA (which are all trade marks of Union Carbide Co., Ltd.).

Further, as usable polyurethane resins having the B value of 10 or less, there are, for example, products obtained by a thermal reticulation of polymers in the presence of water and a diamine as well as under heating conditions, which polymers being formed by extension reactions of polyether polyols such as poly(oxypropylene ether)polyol and poly(oxyethylene propylene ether)polyol, and a chain polyol such as acrylpolyol with diisocyanates such as tolylene diisocyanate, methylene diisocyanate, hexamethylene diisocyanate and methaxylene diisocyanate.

Examples of the usable magnetic powders include a hexagonal system ferrite powders represented by the formula:

$$MO.n(Fe_2O_3)$$

wherein M is any one element of Ba, Sr, Pb and Ca; n is any number of 5 to 9; and Fe may suitably be replaced with a transition element such as Ti, Co, Zn, In, Mn, Cu, Ge and Nb, and a preferred magnetic powder is a Ba-ferrite substitute. As the others, magnetic powders for in-plain recording medium such as $\gamma$-$Fe_2O_3$ powder, a Co-coated $\gamma$-$Fe_2O_3$ powder, a Co-Ni-Fe alloy powder, a Co-Fe alloy powder may also be applicable.

The reason why the hexagonal ferrite powders are preferable as the magnetic powders used in this invention is that they are suitable for the perpendicular magnetic recording as described above.

The magnetic recording medium of this invention can be prepared, for example, as follows:

That is, the magnetic powder and the binder resin are first placed in a dispersing and mixing machine.

A compositional proportion of the vinyl chloride-vinyl acetate series resin to the polyurethane series resin may be applicable such that the proportion is 0/100 (polyurethane series resin only) to 100/0 (vinyl chloride-vinyl acetate series resin only), but preferably be 2/8 to 4/6. If the compositional proportion becomes vinyl chloride-vinyl acetate series resin rich, obtained coating films become hard and occasionally cause cupping of the recording medium thereby it is not preferred. On the other hand, if the compositional proportion becomes polyurethane series resin rich, orientating properties of the obtained film will be slightly lowered while the strength thereof will be improved.

A compositional proportion of the binder resin to the magnetic powder is preferably in the range of 5 to 25 parts by weight, more preferably 10 to 18 parts by weight based on the 100 parts by weight of the magnetic powder. When the proportion of the binder resin is lower than 5 parts by weight, the strength of the magnetic medium is insufficient, however, if it exceeds 25 parts by weight, a lowering of an orientating property of the magnetic powder may be caused.

Further, a solvent for a viscosity adjustment, a dispersing agent, an antistatic agent, a lubricant, an abrasive material and a stabilizing agent are suitably added thereto, and the mixing machine is then run to prepare a magnetic coating composition.

Next, the thus obtained magnetic coating composition is applied to the support by a known manner using, for example, a reverse roll coater, a doctor blade coater or a gravure coater, and a drying and a smoothing treatment are then carried out during a magnetic field orientating or a mechanical orientating treatment preferably in a direction perpendicular to the support surface. In this case, the orientation of the magnetic powder can be accomplished by virtue of methods and apparatus which are described in the specifications of Japanese Provisional Patent Publications No. 163633/1980, No. 58246/1982 and 58247/1982.

Now, the magnetic recording medium of this invention will be described in detail in reference to examples. Typical properties of a magnetic powder (a Ba-ferrite powder) and B values of binders used in the following examples are set forth in Tables 1 and 2 below, respectively.

TABLE 1

| Properties of the Ba—ferrite Powder | |
|---|---|
| Basic composition | $BaO.6(Fe_{0.84}Co_{0.07}Ti_{0.07})_2O_3$ |
| Magnetic easy axes | C axes |
| Saturated magnetization (emu/g) | 60 |
| Coercive force (Oe) | 700 |
| Average particle diameter (μm) | 0.08 |
| Planer ratio (Diameter/thickness ratio) | 10 |

TABLE 2

| | | B value of the binder | |
|---|---|---|---|
| Classification | Type | Name of the binder | B value |
| Vinyl chloride-vinyl acetate series resin | Vinyl chloride-vinyl acetate copolymer | VYHH | 10.5 |
| | | VYHD | 8.46 |
| | | VYLF | 6.65 |
| | Vinyl chloride-vinyl acetate-vinyl alcohol terpolymer | VAGH | 10.9 |
| | | VAGD | 9.5 |
| | | VROH | 8.3 |
| | | VYSM | 7.0 |
| | Vinyl chloride-vinyl acetate-maleic acid terpolymer | VMCH | 8.47 |
| | | VMCC | 7.6 |
| | | VMCA | 7.22 |
| Polyurethane series resin | Polyurethane series polymer | Polymer I*1 | 14.3 |
| | | N-3022*2 | 13.42 |
| | | Polymer II*3 | 12.7 |
| | | N-2301*2 | 11.47 |
| | | Polymer III*4 | 9.1 |
| | | Polymer IV*4 | 6.98 |
| | | Polymer V*4 | 5.52 |

*1 A polymer of polyoxypropylene ether polyol with methaxylene diisocyanate.
*2 Trade name, produced by Nippon polyurethane Co., Ltd.
*3 A polymer of polyoxyethylene-propyl ether polyol with tolylene diisocyanate.
*4 A polymer of polyoxypropylene ether polyol with methylene diisocyanate.

The B values were obtained as follows:

The binder resin was added, in a variety of concentrations, to the respective mixed solvents each including methyl ethyl ketone, toluene and cyclohexanone in a ratio of 1:1:1 in order to form solutions. Apparent viscosities a were measured for the solutions by means of B type viscometer No. 2 rotor. Then, logarithmic values of the apparent viscosities a were plotted to the concentrations x of the resin, thereby drawing a straight line. The desired B value were obtained from an inclination of the drawn straight line.

EXAMPLE 1

A mixture was subjected to a dispersion treatment in order to prepare a magnetic coating composition, which mixture comprising 100 parts by weight of the Ba-ferrite powder, 10 parts by weight of vinyl chloride-vinyl acetate copolymer VYLF (a trade mark; manufactured by Union Carbide Co. Ltd.), 10 parts by weight of polyurethane Polymer V, 3 parts by weight of lecithin, 0.2 parts by weight of stearic acid, 58 parts by weight of methyl ethyl ketone, 58 parts by weight of toluene and 58 parts by weight of cyclohexanone.

With this magnetic coating composition, two polyester support films each having a thickness of 15 μm were coated so that its coating thickness might be 3 μm, and one of the two support films was subjected to a non-orientating treatment and another of the films was subjected to a perpendicular orientating treatment. After a calender treatment, they were each slit into a tape-like form having a width of ½ inch (12.7 mm), so that the magnetic recording media of this invention (a non-orientation tape and a perpendicular orientating tape) were obtained.

For these magnetic recording media, each perpendicular rectangular ratio (Br/Bm ratio) was measured from a ratio of a carrier signal to a noise (C/N ratio) (a frequency of the carrier was 4 MHz and a speed of each tape was 3.5 m/sec) and a hysteresis ring. The C/N ratio was a relative value which was obtained by regarding, as zero decibel, the C/N ratio of the non-orientation magnetic recording medium in Comparative Example 1 referred to below and by employing it as a standard value.

With regard to the prepared magnetic recording media, the C/N ratio of the non-orientation tape and the C/N ratio of the perpendicular orientation tape, and the Br/Bm ratio were measured and the results are shown in the following Table 3.

Further, the B value of a mixed resin of VYLF and polyurethane Polymer V in a ratio of 1:1 was measured in the same manner as described above, and the measured value was also shown in the following Table 3.

EXAMPLES 2-13

Following the method of Example 1, except that the vinyl chloride-vinyl acetate copolymer VYLF used in Example 1 was replaced with respective vinyl chloride-vinyl acetate series resins and that the polyurethane polymer V therein was replaced with respective polyurethane series polymers as shown in Table 3 below, magnetic recording media of this invention were each prepared, and each C/N ratio and a Br/Bm ratio were also measured in the same manner as in Example 1. Results obtained are shown in the following Table 3.

Further, the B value of a mixed resin of respective samples were also measured in the same manner as mentioned above, and the measured value was shown in Table 3.

COMPARATIVE EXAMPLES 1-4

Following the method of Example 1, except that the vinyl chloride-vinyl acetate copolymer VYLF used in Example 1 was replaced with respective vinyl chloride-vinyl acetate series resins and that the polyurethane polymer V therein was replaced with respective polyurethane series polymers, magnetic recording media were each prepared, and each C/N ratio and a Br/Bm ratio were also measured in the same manner as in Example 1. Results obtained are shown in the following Table 3.

Further, the B value of a mixed resin of respective samples were also measured in the same manner as mentioned above, and the measured value was shown in Table 3.

TABLE 3

| | Resin composition | B value | perpendicular rectangular ratio (Br/Bm) | C/N ratio (dB) Non-orientation tape | C/N ratio (dB) Perpendicular orientation tape |
|---|---|---|---|---|---|
| Example 1 | VYLF - Polymer V | 6.0 | 90 | +2.5 | +4.0 |
| Example 2 | VMCC - Polymer V | 6.6 | 90 | +2.5 | +4.0 |
| Example 3 | VROH - Polymer V | 7.0 | 89 | +2.5 | +3.4 |
| Example 4 | VROH - Polymer IV | 7.6 | 89 | +2.5 | +3.4 |
| Example 5 | VMCA - Polymer III | 8.2 | 88 | +2.5 | +3.3 |
| Example 6 | VROH - Polymer III | 8.5 | 88 | +2.5 | +3.3 |
| Example 7 | VAGD - Polymer III | 9.3 | 85 | +1.5 | +2.8 |
| Example 8 | VYLF - N-2301 | 9.1 | 85 | +1.6 | +2.8 |
| Example 9 | VMCC - N-2301 | 9.5 | 84 | +1.7 | +2.8 |
| Example 10 | VMCH - N-2301 | 9.9 | 82 | +1.3 | +2.5 |
| Example 11 | VAGH - Polymer V | 8.2 | 85 | +1.5 | +2.8 |
| Example 12 | VYHH - Polymer III | 9.8 | 82 | +1.2 | +2.3 |
| Example 13 | VYLF - N-3022 | 10.0 | 80 | +1.0 | +2.0 |
| Comparative Example 1 | VAGH - Polymer I | 13.2 | 75 | 0 | +0.3 |
| Comparative Example 2 | VAGH - N-3022 | 12.5 | 74 | 0 | +0.2 |
| Comparative Example 3 | VYHH - N-2301 | 11.2 | 75 | 0 | +0.3 |
| Comparative Example 4 | Polymer I | 14.3 | 70 | −0.5 | −0.5 |

Each C/N ratio was a relative level obtained by taking, as a standard, the C/N ratio of Comparative Example 1.

As is definite from the above description, the magnetic recording medium of this invention includes the binder resin comprising the polymers of which are less interwined with each other. Therefore, the dispersion properties of the magnetic particles are good, which fact permits providing the high density recording medium having the great rectangular ratio and excellent in the noise properties. In view of this effect, it is sure that the industrial merit of this invention is highly great.

We claim:

1. A magnetic recording medium, comprising a hexagonal system ferrite magnetic powder uniformly dispersed in a curable binder resin material comprising at least one of a vinyl chloride-vinyl acetate series resin and a polyurethane series resin, said binder having a B value in a following apparent viscosity equation:

$$\log \eta a = Bx + \log [\eta]$$

wherein $\eta a$ is an apparent viscosity in cP at a temperature of 25° C., x is a resin concentration in weight percent, is a limiting viscosity in cP at a temperature of 25° C., and B is a constant, said B value being 10 or less and measured by dissolving said binder resin material in a mixed solvent of equal weights of methyl ethyl ketone, toluene and cyclohexanone.

2. A magnetic recording medium according to claim 1, wherein said polyurethane series resin comprises the reaction product of a polyether polyol or chain polyol with a diisocyanate comprising tolylene diisocyanate, methylene diisocyanate, hexamethylene diisocyanate and methaxylene diisocyanate.

3. A magnetic recording medium according to claim 2, wherein said polyether polyol comprises poly(oxypropylene ether) polyol or poly(oxyethylene-propylene ether) polyol and said chain polyol comprises acrylpolyol.

4. The magnetic recording medium according to claim 1, wherein said vinyl chloride-vinyl acetate series resin is a resin selected from the group consisting of a vinyl chloride-vinyl acetate copolymer, a vinyl chloride-vinyl acetate-vinyl alcohol terpolyer and a vinyl chloride-vinyl acetate-maleic acid terpolymer.

5. The magnetic recording medium according to claim 1, wherein said polyurethane resin is a reaction product of a chain polyol and a diisocyanate.

6. The magnetic recording medium according to claim 1, wherein said magnetic recording medium comprises 5 to 25 parts by weight of the binder resin based on the 100 parts by weight of the magnetic powder.

7. The magnetic recording medium according to claim 6, wherein said magnetic recording medium comprises 10 to 18 parts by weight of the binder resin based on the 100 parts by weight of the magnetic powder.

8. The magnetic recording medium according to claim 1, wherein the weight ratio of the vinyl chloride-vinyl acetate series resin to the polyurethane series resin being 0/10 to 10/0.

9. The magnetic recording medium according to claim 8, wherein the weight ratio of the vinyl chloride-vinyl acetate series resin to the polyurethane series resin being 2/8 to 4/6.

10. A magnetic recording medium according to claim 2, wherein said polyurethane series resin comprises a polymer of polyoxypropylene ether polyol with methaxylene diisocyanate, a polymer of polyoxyethylenepropyl ether polyol with tolylene diisocyanate or a polymer of polyoxypropylene ether polyol with methylene diisocyanate.

* * * * *